(12) United States Patent
Meggiolan (10) Patent No.: US 10,442,493 B2
(45) Date of Patent: Oct. 15, 2019

(54) CALIPER GROUP OF A DISC BRAKE FOR A BICYCLE AND METHOD FOR MOUNTING A CALIPER GROUP ON A LOAD-BEARING ELEMENT OF A BICYCLE

(71) Applicant: CAMPAGNOLO S.r.l., Vicenza (IT)

(72) Inventor: Mario Meggiolan, Creazzo (IT)

(73) Assignee: CAMPAGNOLO S.r.l., Vicenza (IT)

( * ) Notice: Subject to any disclaimer, the term of this patent is extended or adjusted under 35 U.S.C. 154(b) by 0 days.

(21) Appl. No.: 15/461,656

(22) Filed: Mar. 17, 2017

(65) Prior Publication Data
US 2017/0267311 A1 Sep. 21, 2017

(30) Foreign Application Priority Data
Mar. 18, 2016 (IT) .............................. UA2016A1804

(51) Int. Cl.
| | |
|---|---|
| *B62L 1/00* | (2006.01) |
| *B60T 17/04* | (2006.01) |
| *B62K 19/38* | (2006.01) |
| *F16D 55/225* | (2006.01) |

(52) U.S. Cl.
CPC ............ *B62L 1/005* (2013.01); *B60T 17/046* (2013.01); *B62K 19/38* (2013.01); *F16D 55/225* (2013.01)

(58) Field of Classification Search
CPC ......... B62L 1/005; B62L 3/023; B62K 23/06; B62K 19/38; B60T 17/046; F16D 55/225; B62J 23/00
USPC ............ 188/72.1, 73.31, 26, 24.22; 285/179, 285/189, 192
See application file for complete search history.

(56) References Cited

U.S. PATENT DOCUMENTS

| | | | | |
|---|---|---|---|---|
| 2008/0308363 | A1* | 12/2008 | Choon Chye | B60T 11/046 188/26 |
| 2015/0001012 | A1* | 1/2015 | Noborio | B62L 1/005 188/72.4 |
| 2015/0001014 | A1* | 1/2015 | Noborio | B62L 1/005 188/73.31 |
| 2015/0210345 | A1* | 7/2015 | Noborio | B62L 3/023 188/26 |

(Continued)

FOREIGN PATENT DOCUMENTS

| | | |
|---|---|---|
| CN | 104760652 A | 7/2015 |
| CN | 104986273 A | 10/2015 |
| DE | 102014208317 A1 | 12/2014 |

OTHER PUBLICATIONS

Italian Search Report and Written Opinion in Italian Application No. UA2016A001804, dated Nov. 10, 2016, with English translation.

*Primary Examiner* — Robert A. Siconolfi
*Assistant Examiner* — San M Aung
(74) *Attorney, Agent, or Firm* — Volpe and Koenig, P.C.

(57) ABSTRACT

A hydraulically operated disc brake caliper group with a fixing side faced towards a load-bearing element when mounted on it. The fixing side is configured to substantially rest directly on the load-bearing element, and a hydraulic connector is positioned at the fixing side of the caliper body. This configuration makes it possible to house the tube entirely in the load-bearing element of the bicycle, and to have complete closure of the opening on the load-bearing element. Furthermore, if vibrations generated while the bicycle is in motion loosen the fasteners, they can be retightened without having to dismount the caliper group.

13 Claims, 9 Drawing Sheets

(56) References Cited

U.S. PATENT DOCUMENTS

| | | |
|---|---|---|
| 2015/0210347 A1 | 7/2015 | Chen et al. |
| 2015/0308524 A1* | 10/2015 | Nakakura ............... B62L 1/005 188/71.1 |
| 2016/0169428 A1* | 6/2016 | Nakakura ............... B62J 23/00 188/26 |
| 2016/0272269 A1 | 9/2016 | Tsai et al. |

* cited by examiner

CALIPER GROUP OF A DISC BRAKE FOR A BICYCLE AND METHOD FOR MOUNTING A CALIPER GROUP ON A LOAD-BEARING ELEMENT OF A BICYCLE

CROSS REFERENCE TO RELATED APPLICATION

This application claims the benefit of Italian Application No. UA2016A001804, filed on Mar. 18, 2016, which is incorporated herein by reference as if fully set forth.

FIELD OF INVENTION

The present invention relates to bicycles with hydraulically-controlled disc brakes. More specifically, the invention relates to a caliper group of a disc brake intended to be mounted on a load-bearing element of a bicycle.

BACKGROUND

In high-performance bicycles, in particular but not exclusively in racing bicycles, hydraulically-controlled disc brakes have been widely used for some time, said disc brakes being very popular because they are capable of ensuring a high braking power. These brakes provide for a brake disc mounted on a wheel of the bicycle and rotating as a unit with it and a caliper group mounted on a load-bearing element of the bicycle and active on the disc. The caliper group also comprises a caliper body, inside which at least one pair of jaws is mounted, movable towards one another and provided with respective friction pads for engaging with the brake disc on opposite sides thereof; a hydraulic system is provided for in the caliper body to control the jaws. The hydraulic system of the caliper body must be supplied with pressurized fluid (generally oil) and consequently the bicycle must be equipped with a tube for supplying pressurized fluid and with a hydraulic brake control to control the supply of pressurized fluid in the tube.

The arrangement of the tube on the bicycle can provide for the tube to be partially housed inside the load-bearing elements of the bicycle, such as the handlebars, the fork and the frame.

The tube and the relative fittings can lead to a worsening of the aerodynamic characteristics of the bicycle; such worsening can be particularly unwanted in the case of racing bicycles, where the greatest care is applied to each detail that can improve performance. Furthermore, a tube housed inside the load-bearing elements of the bicycle is protected from bumps and does not risk becoming tangled with foreign bodies that can be located very close to the bicycle when in motion. Finally, a tube housed internally is not visible and therefore does not disturb the aesthetics of the bicycle.

A caliper group is known that is mounted on the load-bearing element of the bicycle right at an opening from which the tube for supplying pressurized fluid comes out, through a base member. The base member acts as a mechanical interface between the caliper group and the load-bearing element of the bicycle. The Applicant has however realized that the vibrations that are produced while the bicycle is travelling on the road can cause a loosening of the fasteners with which the caliper group is fixed to the base member and/or of the fasteners with which the base member is fixed to the load-bearing element. In both cases it is necessary to retighten the loosened fasteners; in the second case, furthermore, in order to be able to tighten the fasteners it is necessary to first dismount the caliper group from the base member, in order to be able to gain access to the loosened fasteners. Then a relatively long and complex intervention is necessary, which—if it needs to be carried out during a race—would unacceptably penalize the cyclist.

The present invention therefore refers to a caliper group having a fixing side configured to rest directly on a load-bearing element with the hydraulic connector positioned on the fixing side that addresses the problem of retightening the fasteners.

SUMMARY

The disclosed caliper group comprises a caliper body, at least one pair of movable jaws that are provided with respective friction pads adapted for engaging with a brake disc, and a hydraulic system for controlling movement of the jaws. The caliper body has a fixing side, configured to face towards the load-bearing element when the caliper group is mounted on it. The hydraulic system has a hydraulic connector adapted for connecting to a tube for supplying pressurized fluid. The fixing side is configured to be fixed to and substantially rest directly on the load-bearing element, and the hydraulic connector is positioned at the fixing side of the caliper body.

BRIEF DESCRIPTION OF THE DRAWINGS

Further features and advantages of the invention will become clearer from the following description of some preferred embodiments thereof, made with reference to the attached drawings. In such drawings:

FIG. 5b is a section view according to a different plane of the load-bearing element and of the caliper group of FIG. 5a;

FIG. 6b is a section view according to a different plane of the load-bearing element and of the caliper group of FIG. 6a.

DETAILED DESCRIPTION OF THE PREFERRED EMBODIMENTS

In a first aspect of the invention, the caliper group comprises a caliper body, at least one pair of jaws movable towards one another and provided with respective friction pads adapted for engaging with a brake disc, a hydraulic system for controlling the jaws; the caliper body has a fixing side, intended to face towards the load-bearing element when the caliper group is mounted on it; the hydraulic system comprises a hydraulic connector adapted for being connected to a tube for supplying pressurized fluid. The fixing side is configured so as to substantially totally rest directly on the load-bearing element, when fixed to it, and the hydraulic connector is positioned at the fixing side of the caliper body.

This configuration of the caliper body makes it possible to house the tube entirely in the load-bearing element of the bicycle, without having to take it out near to the caliper body in order to be able to connect it to the hydraulic connector. The tube and the connector are thus not in an exposed position, but rather are protected by the load-bearing element and by the caliper body itself. This positioning favors the aerodynamics of the bicycle and at the same time ensures excellent protection of the tube with respect to possible bumps. Furthermore, the configuration of the fixing side allows complete closure of the opening on the load-bearing element, preventing dirt and humidity from being able to penetrate inside while the bicycle is in motion. Furthermore, if the vibrations generated while the bicycle is in motion should lead to loosening of the means with which the caliper body is fixed to the load-bearing element, they can easily be retightened, without having to dismount the caliper group to do so.

In a preferred embodiment, the hydraulic connector is positioned in a recess formed in the caliper body, at the fixing side. This embodiment is advantageous in the case in which the load-bearing element is small in size; in this way, indeed, after its mounting, the connector—relatively bulky with respect to the tube—stays outside the load-bearing element and just the tube can be made to pass inside the load-bearing element.

In another preferred embodiment, the hydraulic connector protrudes from the caliper body, at the fixing side. This embodiment is advantageous to reduce the size of the caliper body to the minimum, even if of course it requires that the load-bearing element be of sufficiently large size to also receive the connector; indeed, after its mounting, the connector—relatively bulky—stays received in the load-bearing element.

Preferably, the caliper group comprises mounting screws for mounting the caliper body on the load-bearing element.

Preferably, the caliper body comprises, at the fixing side, at least two mounting holes for receiving the mounting screws, and the hydraulic connector is positioned between the two mounting holes. This configuration allows the caliper body to be fixed to the load-bearing element in a balanced manner with respect to the position of the connector and of the tube; it is thus ensured that there is better tightening of the caliper body on the load-bearing element and thus better protection of the connector and of the tube.

In a preferred embodiment, the hydraulic connector is oriented substantially perpendicular to the fixing side. This configuration reduces the space necessary for the passage of the connector with the tube through the wall of the load-bearing element to the minimum and thus allows the size of the opening in such an element to be reduced.

In another preferred embodiment, the hydraulic connector is oriented substantially inclined at 45° with respect to the fixing side. This configuration makes it easier to insert the connector with the tube in the load-bearing element, through the opening formed in the wall of the load-bearing element.

Preferably, the hydraulic connector is associated with a fitting, removably mounted on the hydraulic connector. In this way, the connection of the tube to the connector can be simplified; indeed, it is possible to first connect the tube to only the fitting, which is easy for the operator to handle since it is separate from the caliper body, and then connect the fitting to the hydraulic connector.

In a second aspect thereof, the invention provides for a method for mounting a caliper group according to the first aspect of the invention on a load-bearing element of a bicycle; according to this method, a tube for supplying pressurized fluid is connected to the hydraulic connector of the caliper group before the caliper group is brought up to and then fixed to the load-bearing element.

In this way, the tube is adequately protected and mounting of the caliper group is simplified. Preferably, the method comprises the steps, of inserting the tube in the load-bearing element and making it poke out from the opening connecting the tube to the hydraulic connector of the caliper group, bringing the caliper group up to the load-bearing element at the same time guiding the tube in the cavity of the load-bearing element, and fixing the caliper group to the load-bearing element.

Alternatively, the method comprises the steps of connecting the tube to the hydraulic connector of the caliper group, inserting the tube in the opening in the load-bearing element, bringing the caliper group up to the load-bearing element at the same time guiding the tube in the cavity of the load-bearing element, fixing the caliper group to the load-bearing element, connecting the tube to every other hydraulic component of the bicycle.

In a third aspect thereof, the invention relates to a bicycle comprising a load-bearing element, a brake disc mounted so as to rotate as a unit with a wheel of the bicycle and at least one caliper group according to the second aspect of the invention, mounted on the load-bearing element and active on the brake disc.

Figure 1:
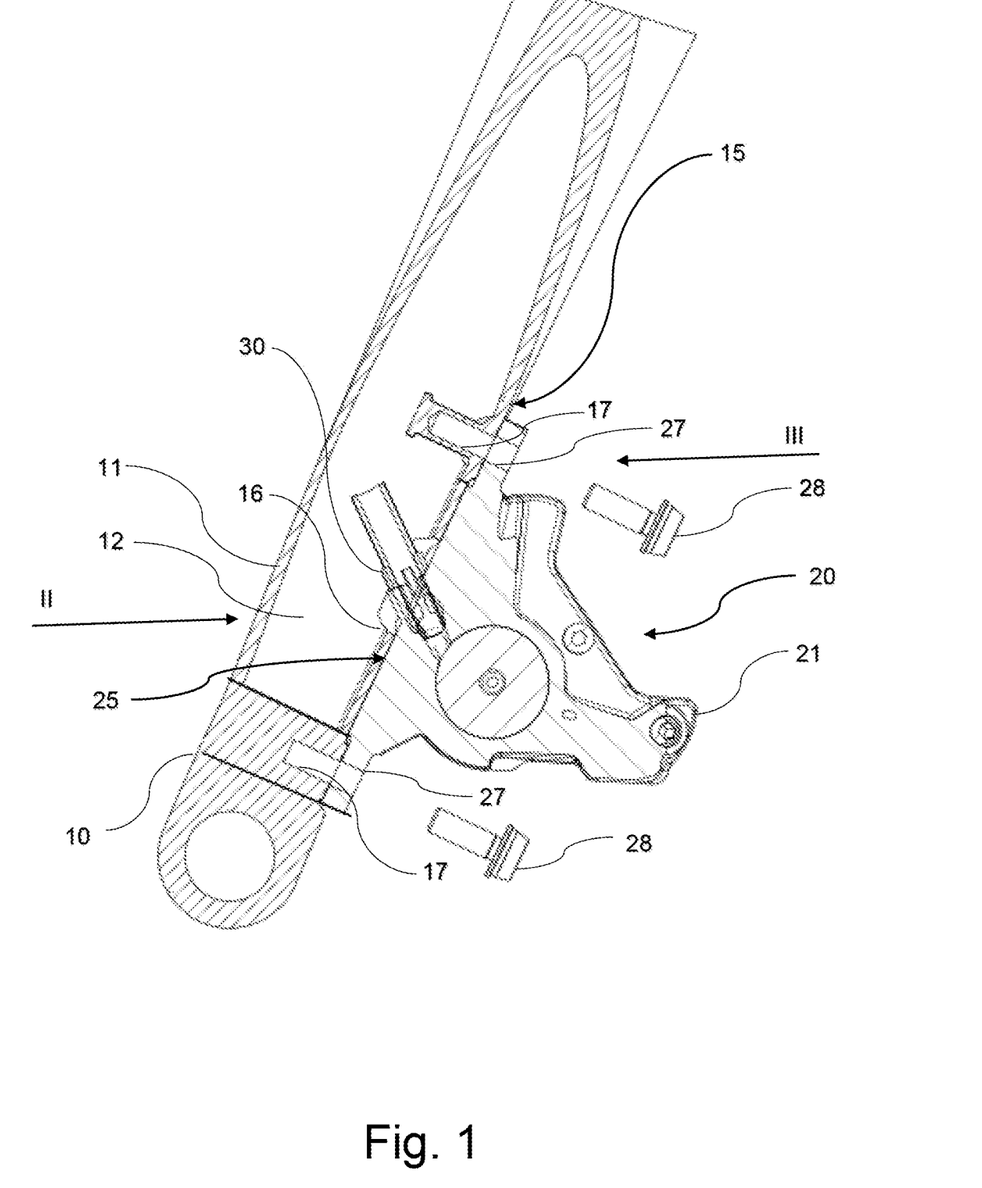
FIG. 1 is a section view of a load-bearing element and of a caliper group according to a first embodiment of the invention, referring to a front disc brake.
Figure 2:
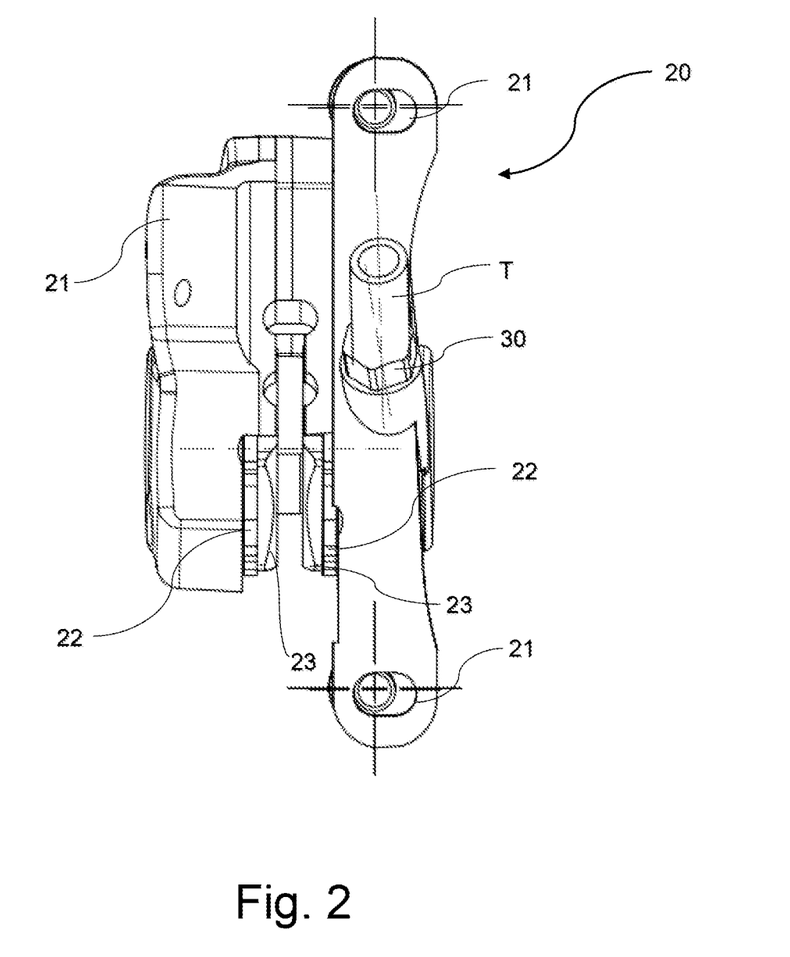
FIG. 2 is a view of the caliper group of FIG. 1 separated from the load-bearing element, taken according to the arrow II of FIG. 1.

FIGS. 1 and 2 show a load-bearing element 10 of a bicycle, in particular an arm of a front fork. The load-bearing element 10 has a hollow structure and comprises a peripheral wall 11 that surrounds and encloses an inner cavity 12.

The load-bearing element 10 comprises a fixing area 15, in the position in which mounting of a caliper group of a disc brake is provided for. At this fixing area 15, an opening 16 is formed in the peripheral wall 11 of the load-bearing element 10. Mounting holes 17, in particular two threaded mounting holes 17, are formed in the load-bearing element 10, in the fixing area 15, on opposite sides around the opening 16, so that the opening 16 is positioned between the mounting holes 17.

As can be seen in FIGS. 1 and 2, at the fixing area 15, a caliper group 20 of a disc brake is mounted on the load-bearing element 10. The caliper group 20 comprises a caliper body 21 inside which at least one pair of jaws 22 are mounted, moveable towards one another and provided with respective friction pads 23, adapted for engaging with a brake disc. The caliper body 21 has a fixing side 25, intended to face towards the load-bearing element 10 when the caliper group 20 is mounted on it, as shown in FIG. 1.

Inside the caliper body 21 there is a hydraulic system for controlling the jaws 22; the hydraulic system comprises a hydraulic connector 30, adapted to be connected to a tube T for supplying pressurized fluid; the hydraulic connector 30 is positioned at the fixing side 25 of the caliper body 21, in a recess 31.

The caliper body 21 comprises at least two mounting holes 27 for receiving respective mounting fasteners, such as bolts or screws 28, of the caliper body 21 at the load-bearing element 10. The mounting holes 27 are formed at the fixing side 25 on opposite sides around the hydraulic connector 30, so that the hydraulic connector 30 is positioned between the mounting holes 27. When the caliper group 20 is mounted on the load-bearing element 10 (as shown in FIG. 1), the mounting holes 27 on the caliper body 21 are at the mounting holes 17 on the load-bearing element 10, so that the mounting fasteners 28, can pass through the mounting holes 27 and engage in the mounting holes 17.

The fixing side 25 is configured so as to substantially totally rest on the load-bearing element 10, when fixed to it.

The hydraulic connector 30 is oriented substantially inclined at 45° with respect to the fixing side 25, and when the caliper group 20 is mounted on the load-bearing element 10, as shown in FIG. 1 faces the opening 16 formed on the load-bearing element 10.

Mounting of the caliper group 20 on the load-bearing element 10 takes place in the following way.

First, the tube T for supplying pressurized fluid (possibly and preferably already connected to the brake control) is arranged on the bicycle, inserted inside the load-bearing element 10 and poking out from the opening 16. Thereafter, the tube T is connected to the fitting 32 and the fitting 32 is connected to the hydraulic connector 30 of the caliper group 20. The caliper group 20 is then brought up to the load-bearing element 10, at the same time guiding the tube T in the inner cavity 12 of the load-bearing element 10. At this point, the caliper group 20 is fixed to the load-bearing element 10, through the mounting fasteners 28 (inserted in the mounting holes 27 in the caliper body 21 and screwed into the threaded mounting holes 17 in the load-bearing element 10) and the tube T is connected to every other hydraulic component of the bicycle, typically to a brake control group.

Alternatively, mounting can provide for the tube T for supplying pressurized fluid (not yet connected to the brake control) to be first connected to the fitting 32. Thereafter, the tube T is inserted into the opening 16 in the load-bearing element 10 and the fitting 32 is connected to the hydraulic connector 30 of the caliper group 20. The caliper group 20 is then brought up to the load-bearing element 10, at the same time guiding the tube T in the inner cavity 12 of the load-bearing element 10. At this point, the caliper group 20 is fixed to the load-bearing element 10, through the mounting fasteners 28 and the tube T is connected to every other hydraulic component of the bicycle, typically to the brake control group.

Once mounting is complete, the tube T is totally inside the load-bearing element 10, not visible from the outside, in a protected and aerodynamically favorable position; this is true even if the caliper group 20 is slightly distanced from the load-bearing element 10. Furthermore, this configuration ensures that the assembly has a cleaner appearance, certainly desirable for a demanding user. Furthermore, the caliper body 21 completely closes the opening 16 in the load-bearing element, preventing undesired elements such as water, humidity and dirt from being able to penetrate into the load-bearing element 20.

Figure 3:
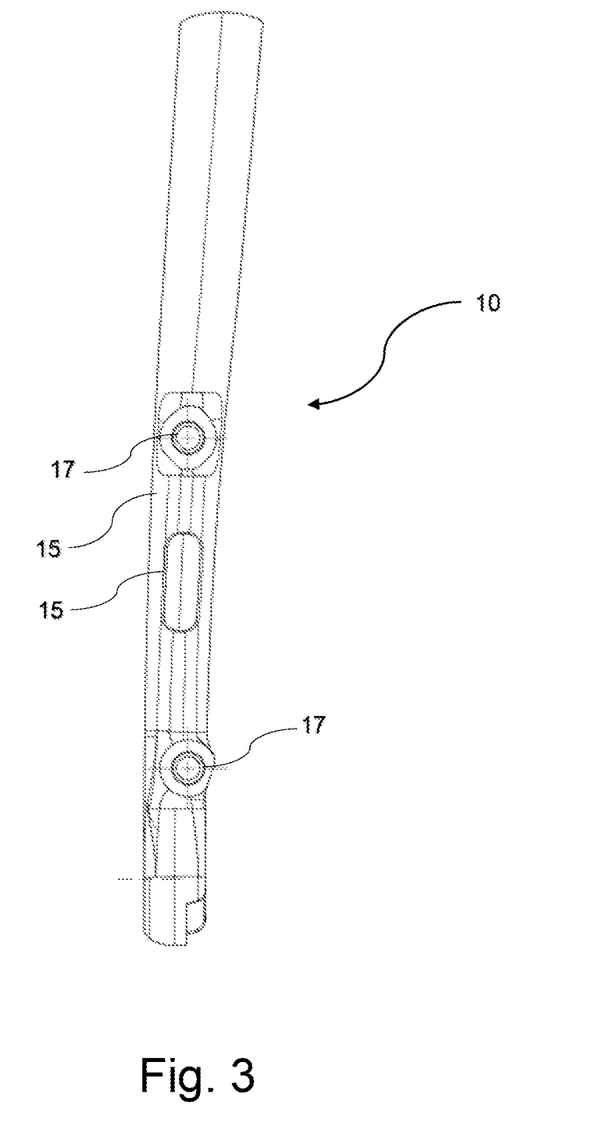
FIG. 3 is a view of the load-bearing element shown in FIG. 1, taken according to the arrow III of FIG. 1

FIGS. 4 to 6b show other embodiments of the invention. Hereinafter, these embodiments will be described only as far as they differ from the first embodiment shown in FIGS. 1 to 3. The elements of the various embodiments of the invention that are substantially the same as those of the first embodiment will not be described in general and in the figures they will be marked with the same reference numerals used for the first embodiment.

Figure 4:
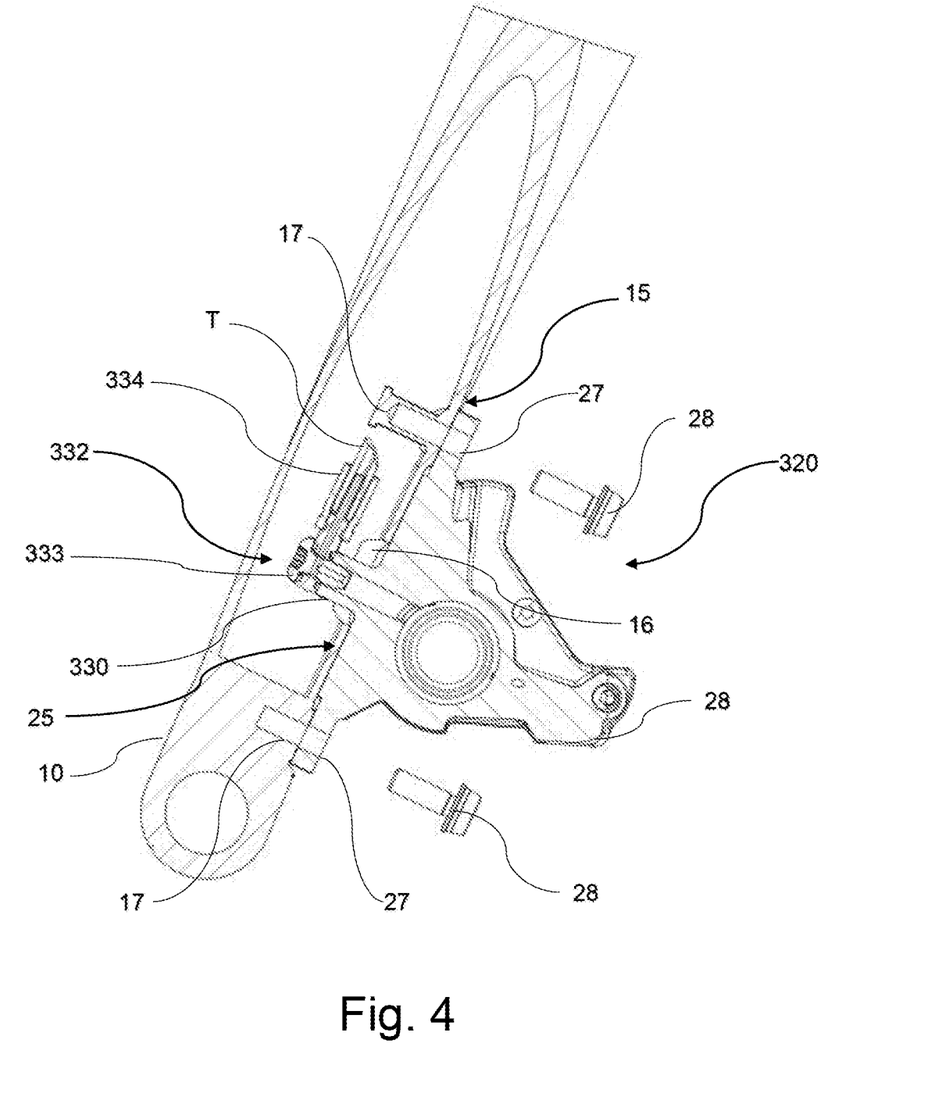
FIG. 4 is a section view of a load-bearing element and of a caliper group according to a second embodiment of the invention, referring to a front disc brake.

The second embodiment, shown in FIG. 4, also refers to a front disc brake and therefore the load-bearing element 10 is once again an arm of a front fork, equipped with the same features described for the first embodiment of the invention.

The caliper group, on the other hand, indicated with 320, differs from the caliper group 20 of the first embodiment of the invention for a different hydraulic connector, indicated with 330, which is oriented substantially perpendicular to the fixing side 25. Such a connector 330 is sealably associated with a fitting 332, which has an angled shape, with a first and a second portion 333 and 334, angled by about 90° with respect to each other.

The hydraulic connector 330 is positioned at the fixing side 25, protruding from it.

Mounting of the caliper group 320 on the load-bearing element 10 takes place in the same way as that of the caliper group 20.

Figure 5A:
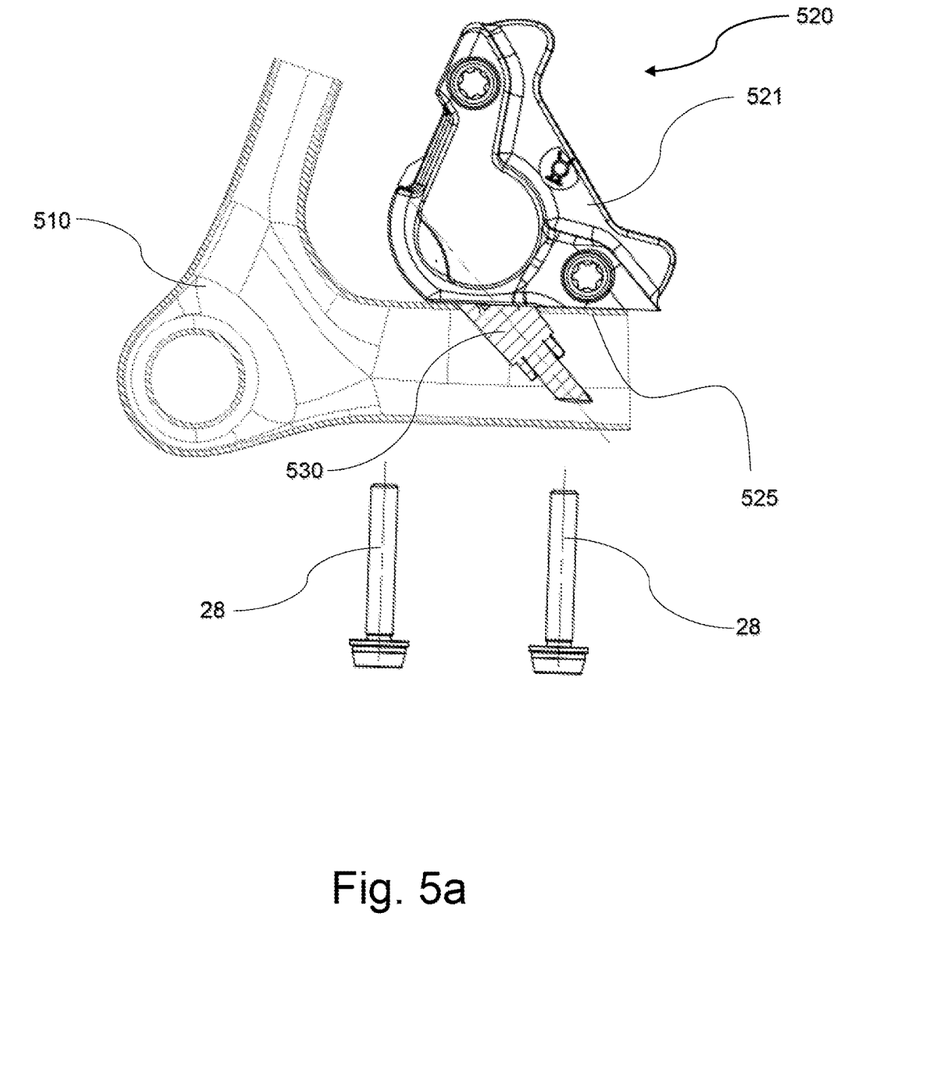
FIG. 5a is a section view of a load-bearing element and of a caliper group according to a third embodiment of the invention, referring to a rear disc brake.
Figure 5B:
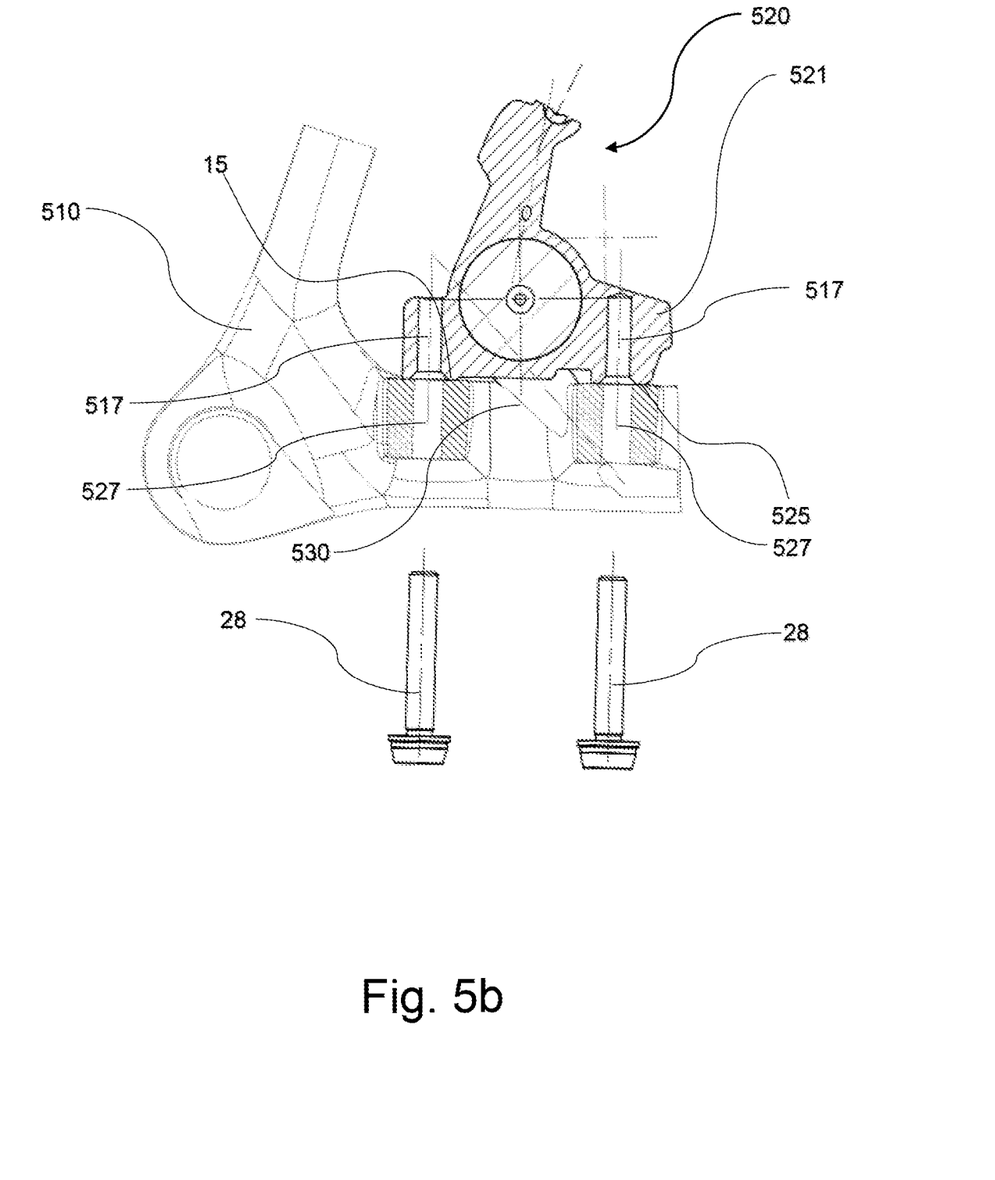
Figure 5C:
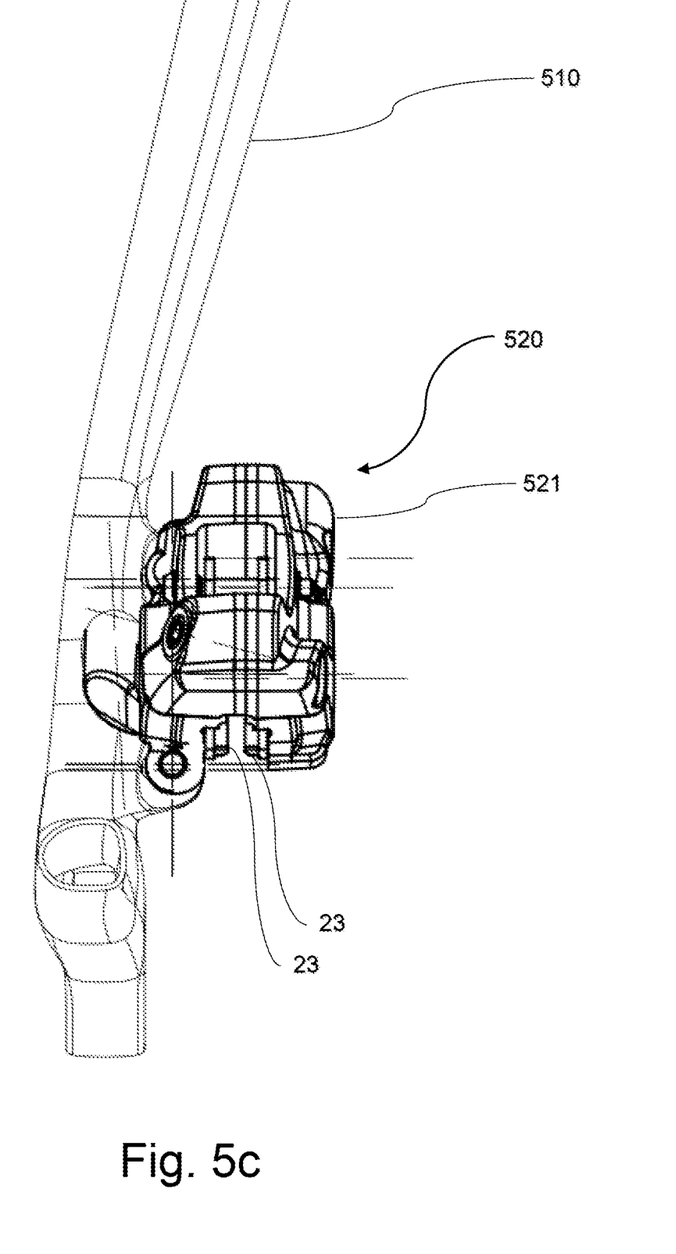
FIG. 5c is a view from above of the caliper group and of the load-bearing element shown in FIGS. 5a and 5b.

The third embodiment, shown in FIGS. 5a, 5b and 5c, refers to a rear disc brake; the load-bearing element 510 is a portion of frame close to a rear wheel, otherwise provided with the same features of the load-bearing element 10 of the first embodiment of the invention.

The caliper group, indicated with 520, differs from the caliper group 20 of the first embodiment of the invention for a different hydraulic connector, indicated with 530, which substantially protrudes from the fixing side 525 of the caliper body 521, so as to be inserted in the opening 16 of the load-bearing element 510, when the caliper group 520 is mounted on it.

Mounting of the caliper group 520 on the load-bearing element 510 takes place in a way not very dissimilar from that of the caliper group 20. One difference is that the fixing fasteners 28 are inserted in the holes 527 in the load-bearing element 510 and are screwed into the fixing holes 517 in the caliper body 520 (and not vice-versa, as provided for in the first two embodiments of the invention).

Figure 6A:
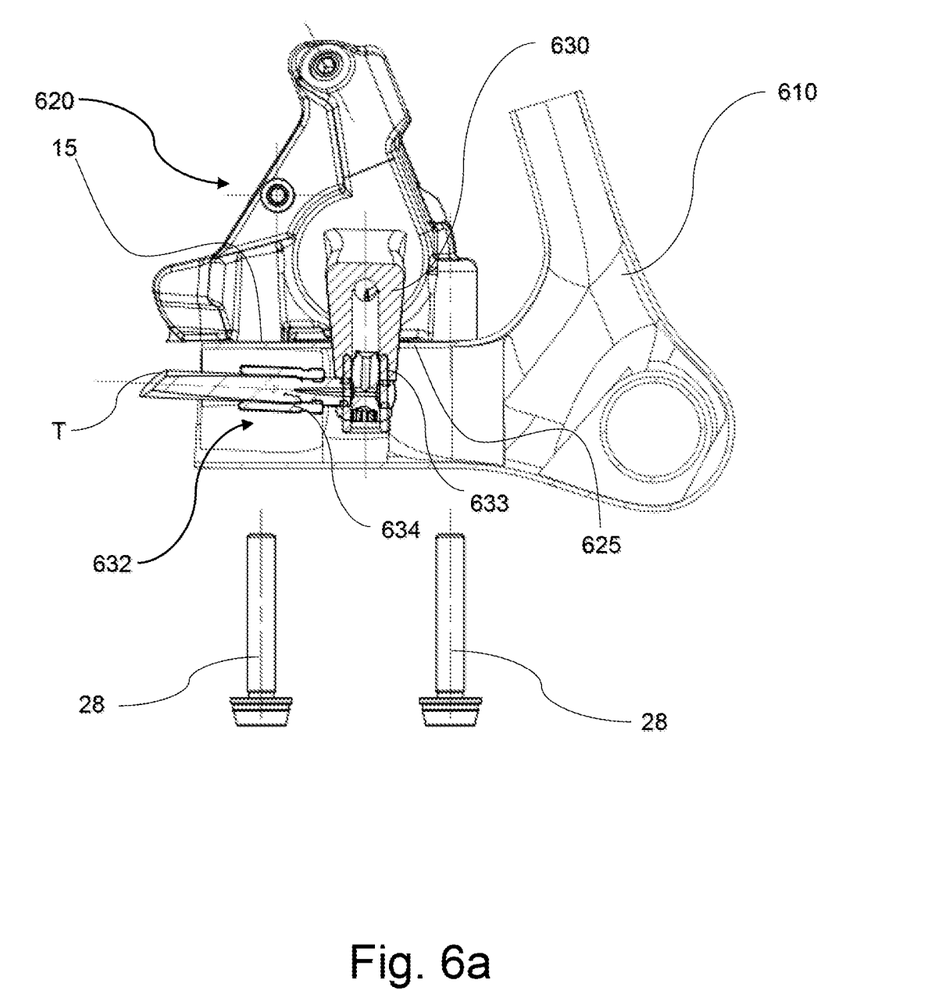
FIG. 6a is a section view of a load-bearing element and of a caliper group according to a fourth embodiment of the invention, referring to a rear disc brake.
Figure 6B:
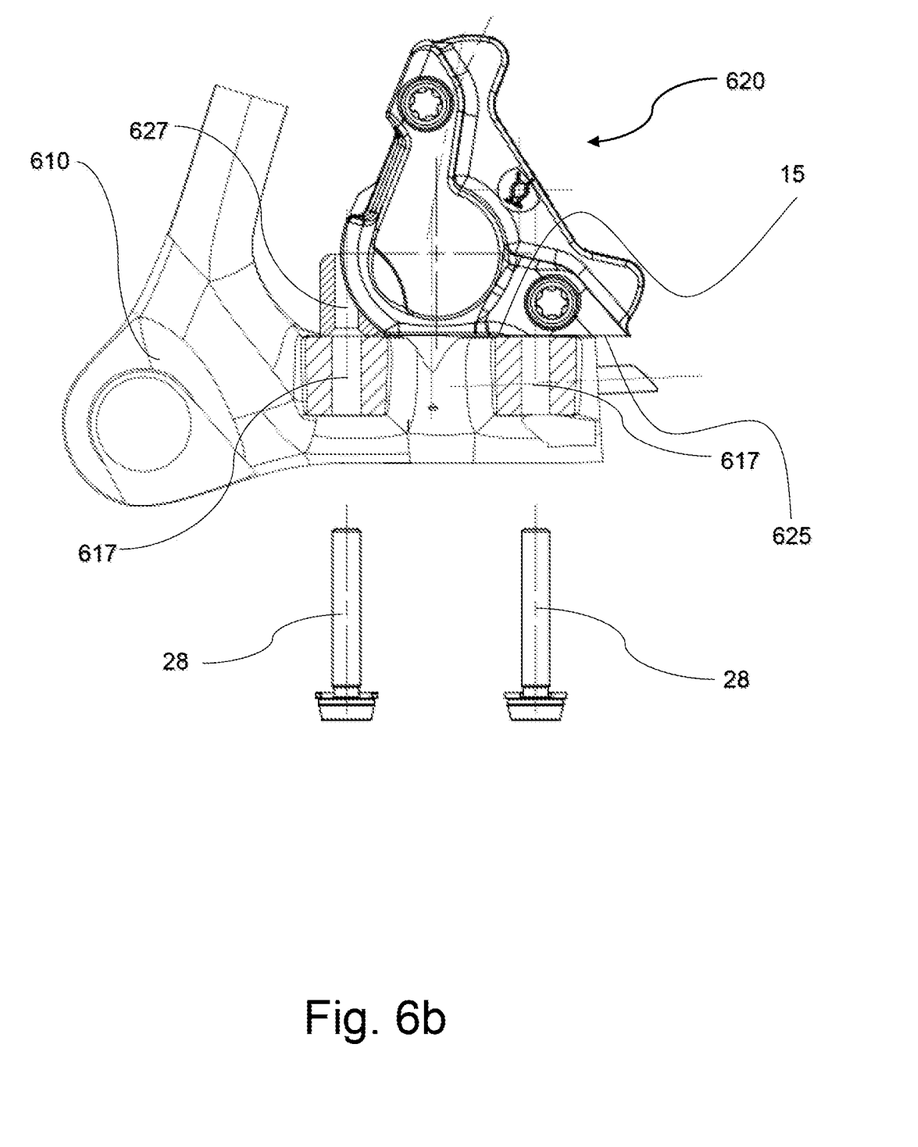

The fourth embodiment, shown in FIGS. 6a and 6b, refers to a rear disc brake; the load-bearing element 610 is a portion of frame close to a rear wheel, otherwise provided with the same features of the load-bearing element 10 of the first embodiment of the invention.

The caliper group, indicated with 620, differs from the caliper group 20 of the first embodiment of the invention for a different hydraulic connector, indicated with 630, which is oriented substantially perpendicular to the fixing side 625. Similarly to the second embodiment shown in FIG. 4, there is a fitting 632, which has an angled shape, with a first and a second portion 633 and 634, angled by about 90° with respect to each other.

Mounting of the caliper group 620 on the load-bearing element 610 takes place in the same way as that of the caliper group 20, except that the fixing fasteners 28 are inserted in the holes 627 in the load-bearing element 610 and are screwed into the fixing holes 617 in the caliper body 620 (similarly to the third embodiment of the invention).

Of course, those skilled in the art will understand that the features of the invention, described with reference to the preferred embodiments shown in the figures, can be combined with each other in a different manner, encompassed by what is defined by the claims.

What is claimed is:

1. A caliper group of a disc brake intended to be mounted on a load-bearing element of a bicycle, comprising a caliper body, at least one pair of jaws moveable towards one another and provided with respective friction pads adapted for engagement with a brake disc, a hydraulic system for controlling the jaws, wherein the caliper body has a fixing side, intended to face towards the load-bearing element when the caliper group is mounted thereon, and wherein the hydraulic system comprises a hydraulic connector that is connected to a tube for supplying pressurized fluid, wherein the fixing side is configured so that substantially all of the fixing side is in direct contact with the load-bearing element and the hydraulic connector is positioned at the fixing side of the caliper body, and the hydraulic connector is inclined at an angle of about 45° with respect to the fixing side.

2. The caliper group according to claim 1, wherein the hydraulic connector is positioned in a recess formed in the caliper body, at the fixing side.

3. The caliper group according to claim 1, wherein the hydraulic connector protrudes from the caliper body, at the fixing side.

4. The caliper group according to claim 1, further comprising fasteners for mounting the caliper body directly on the load-bearing element.

5. The caliper group according to claim 4, wherein the caliper body comprises, at the fixing side, at least two mounting holes for receiving the mounting fasteners, and wherein the hydraulic connector is positioned in a recess between the two mounting holes.

6. The caliper group according to claim 1, wherein the hydraulic connector is oriented substantially perpendicular to the fixing side.

7. The caliper group according to claim 1, wherein the hydraulic connector is associated with a fitting, removably mounted on the hydraulic connector.

8. A method for mounting a caliper group according to claim 1 on a load-bearing element of a bicycle, wherein a tube for supplying pressurized fluid is connected to the hydraulic connector of the caliper group before the caliper group is brought up to and then fixed to the load-bearing element.

9. The method according to claim 8, further comprising the steps of:
inserting the tube into the load-bearing element and making it come out from an opening,
connecting the tube to the hydraulic connector of the caliper group,
bringing the caliper group up to the load-bearing element at the same time guiding the tube in a cavity of the load-bearing element, and, fixing the caliper group to the load-bearing element.

10. The method of claim 8 wherein the steps are carried out in the recited order.

11. The method according to claim 8, further comprising the steps of:
connecting the tube to the hydraulic connector of the caliper group,
inserting the tube into an opening in the load-bearing element,
bringing the caliper group up to the load-bearing element at the same time guiding the tube in a cavity of the load-bearing element,
fixing the caliper group to the load-bearing element, and,
connecting the tube to every other hydraulic component of the bicycle.

12. The method of claim 11 wherein the steps are carried out in the recited order.

13. A bicycle comprising a load-bearing element, a brake disc mounted so as to rotate as a unit with a wheel of the bicycle and at least one caliper group according to claim 1, mounted on the load-bearing element and active on the brake disc.

* * * * *